United States Patent Office 3,102,117
Patented Aug. 27, 1963

3,102,117
STEROIDAL LACTONES
Otto Halpern, Mexico City, Mexico, assignor, by mesne assignments, to Syntex Corporation, a corporation of Panama
No Drawing. Filed Feb. 10, 1961, Ser. No. 88,258
14 Claims. (Cl. 260—239.57)

The present invention relates to novel cyclopentanophenanthrene compounds and to a novel process for the production thereof.

More particularly the present invention relates to novel C–12 and C–11,12 lactones of the androstane and pregnane series.

The novel compounds of the present invention which are aldosterone blockers having anabolic, anti-estrogenic and anti-gonadotrophic activity are represented by the following formulas:

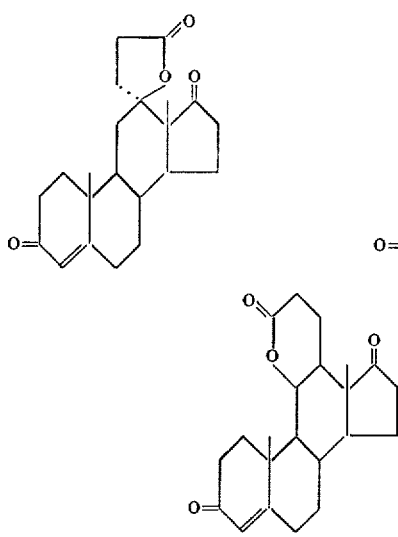

The novel compounds of the present invention which are aldosterone antagonists having anti-ovulatory, anti-estrogenic, anti-androgenic and anti-gonadotrophic activity are represented by the following formulas:

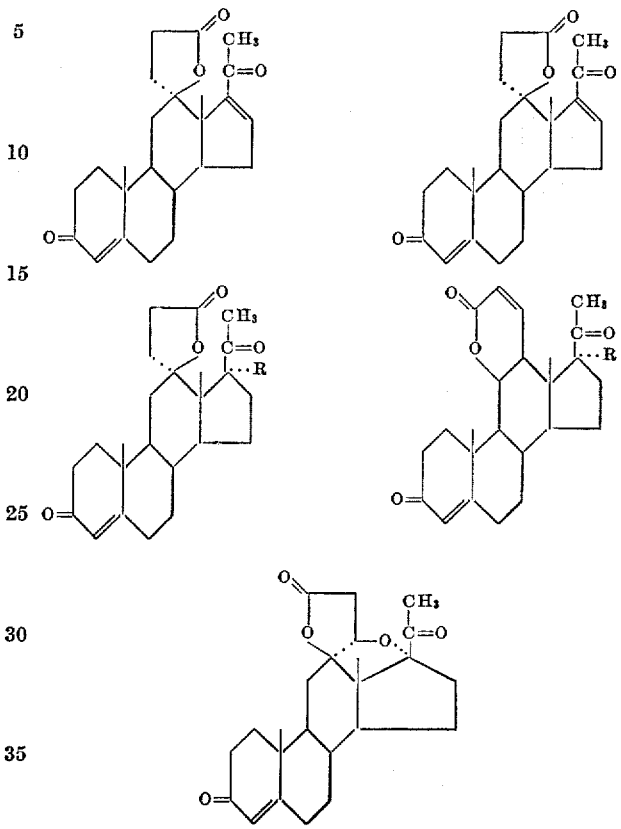

In the above formulas R represents hydrogen or hydroxy.

The novel compounds of the present invention which contain a lactone ring at C–12 are prepared by a process illustrated by the following equation:

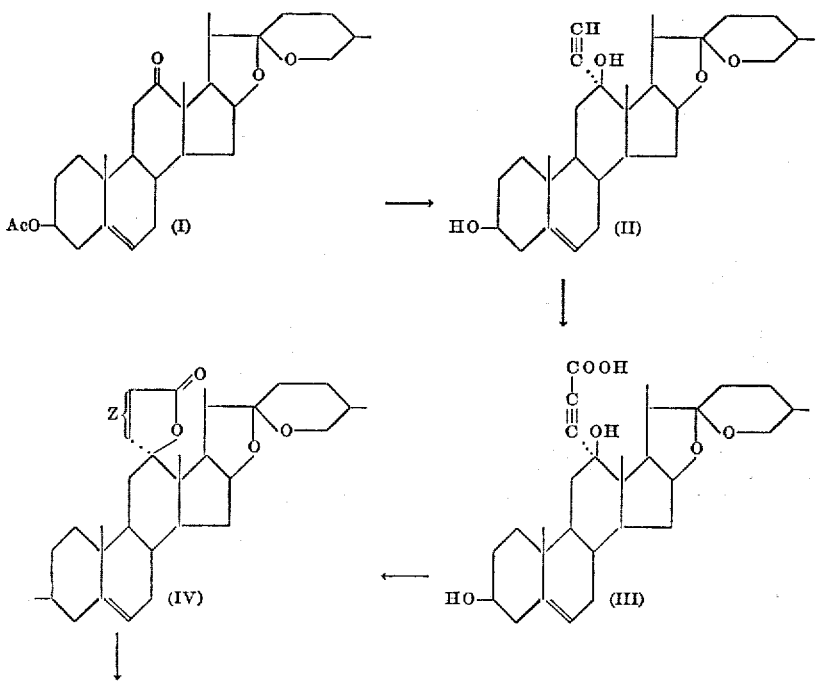

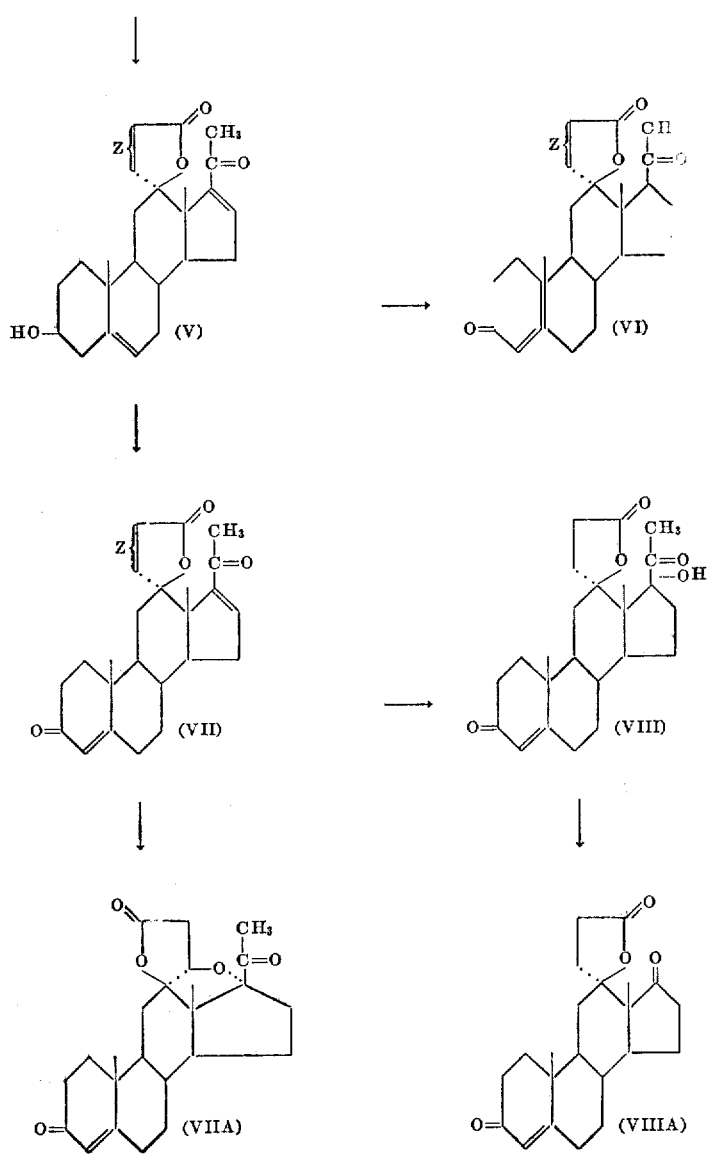

In the above formulas, Z represents either a single or a double bond in the exocyclic ring.

In practicing the process outlined above, botogenin acetate (I) dissolved in a solvent such as dioxane, ether or a mixture of ethers, is added to sodium acetylide in liquid ammonia. The thus formed steroidal ethinyl compound (II) is refluxed in a solvent such as tetrahydrofuran with a Grignard reagent such as methyl magnesium halide. Carbon dioxide is then passed through the reaction mixture and there is formed the C–12 propiolic acid (III). Upon hydrogenation of the latter compound in the presence of a Lindlar catalyst there is formed the corresponding C–12 propenoic acid which spontaneously forms the lactone ring (IV:Z=double bond). However hydrogenation of the C–12 propiolic acid (III) over a palladium on charcoal catalyst results in the formation of the C–12 propionic acid which similarly forms the saturated lactone ring (IV:Z=single bond) spontaneously.

Degradation of the spiroketal side chain is then effected by conventional procedure as by reaction with acetic anhydride at about 200° C., oxidation of the resulting pseudo compound to the diosone followed by alkaline hydrolysis and finally acid treatment to close the lactone ring to form the corresponding C–12 unsaturated or saturated lactonic $\Delta^{5,16}$-20-dione compound (V). Upon oxidation under Oppenauer conditions, the 3β-hydroxyl group is oxidized to the keto group and the double bond at C–5,6 shifts to C–4,5 thus forming the corresponding $\Delta^4$-3-keto-12-lactones (VII). Partial hydrogenation of the $\Delta^{5,16}$-lactone (V) gave the $\Delta^5$-compound which upon oxidation under Oppenauer conditions gave compound VI.

For introduction of an oxygen function at C–17α, the 16,17-double bond is first epoxidized, preferably by reaction with t-butylhydroperoxide in a solvent such as benzene using Triton B as catalyst to form the 16α,17α-epoxide; the epoxide ring is then opened by treatment with hydrogen bromide and the resulting 16β-bromo-17α-oxygenated compound is reductively debrominated as by refluxing with Raney nickel or by treatment with hydrogen in a solvent such as ethanol and in the presence of a palladium catalyst to thus form the 17α-hydroxy-20-keto-12-lactone (VIII), or the corresponding ether (VIIA). Upon oxidation of the former compound with an oxidizing agent such as lead tetraacetate, degradation of the C–17 side chain occurs to form the C–17 keto-12-lactone (VIIIA).

The novel compounds of the present invention which contain a lactone ring fused to ring C at C–11,12 are prepared by a process illustrated by the following equation:

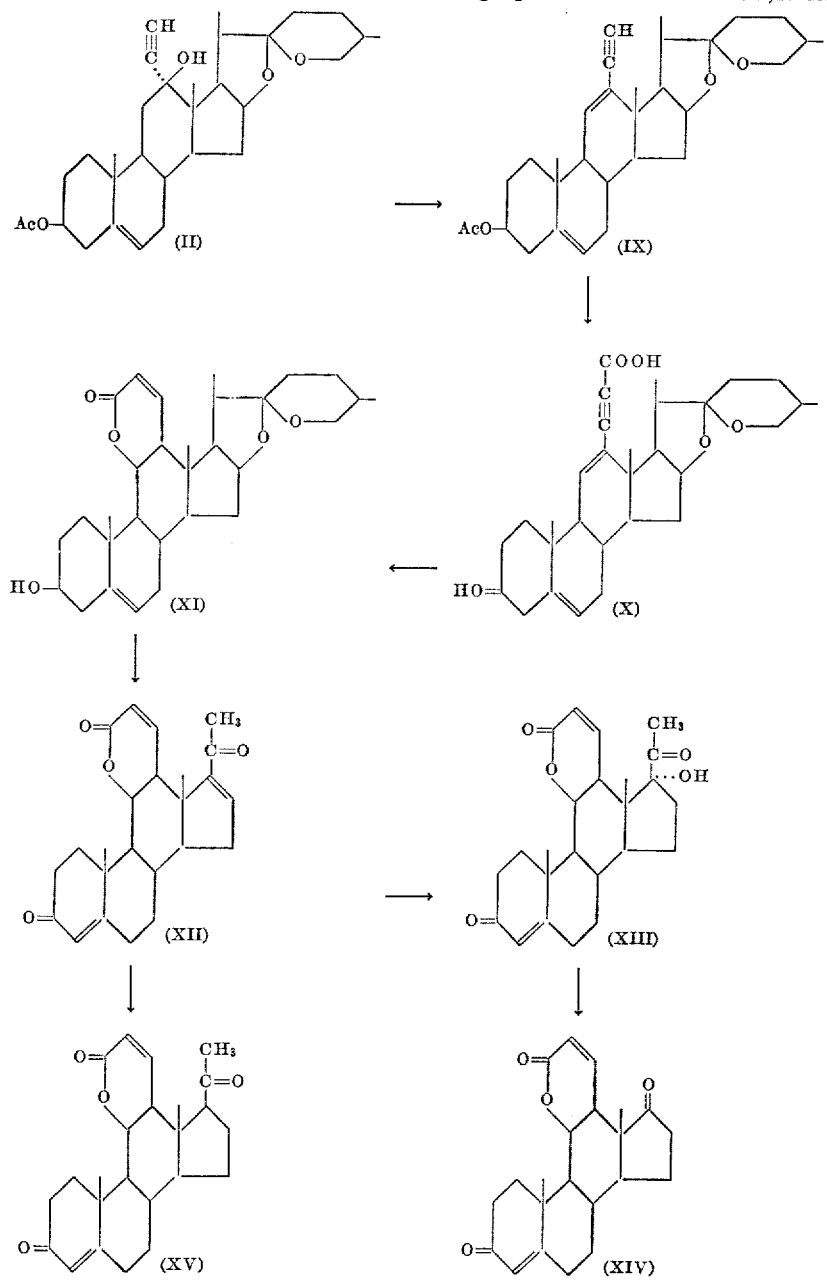

In practicing the process outlined above, the steroidal ethinyl compound (II) is treated with a dehydrating agent such as thionyl chloride in pyridine solution to introduce a double bond at C–11,12 (IX). The thus formed 12-ethinyl-$\Delta^{11}$-compound is refluxed with a Grignard reagent, preferably a methyl magnesium halide in a solvent such as ether, dioxane or tetrahydrofuran, followed by the passage of carbon dioxide through the reaction mixture to form the $\Delta^{11}$-12-propiolic acid (X). Upon hydrogenation of the latter compound in the presence of a Lindlar catalyst, the corresponding 12-propenoic acid is formed which upon further treatment with acid is converted into a lactone ring fused at C–11 and C–12 (XI). Degradation of the spiroketal side chain as set forth above is then effected followed by oxidation under Oppenauer conditions to form the corresponding lactone of a $\Delta^{16}$-progesterone (XII). A hydroxyl group is then introduced at C–17α as described previously to afford compound XIII which upon further reaction with lead tetraacetate is converted into the C–11,12 lactone of $\Delta^4$-androstene-3,17-dione (XIV). Hydrogenation of compound XII in the presence of palladium on charcoal catalyst gave the progesterone lactone XV.

The following examples serve to illustrate but are not intended to limit the scope of the invention:

*Example 1*

A solution of 17.5 g. of sodium in 1250 cc. of liquid ammonia was treated with 200 mg. of ferric nitrate and then a stream of dried and purified acetylene was passed through the solution for 1 hour. To the grey suspension there was added a solution of 25 g. of botogenin acetate in 250 cc. of dioxane and 1 lt. of ether. The mixture was stirred for 5 hours in a Dry Ice-acetone bath, then 75 g. of ammonium chloride was added and the ammonia evaporated. The residue was taken up in dilute acetic acid, extracted several times with ethyl acetate-ether 1:1, and the combined extracts washed with water, dried over anhydrous sodium sulfate and evaporated to dryness. Recrystallization of a small amount of the above compound from methanol gave the pure 12a-ethinyl-Δ⁵-22-isospirostene-3β,12β-diol.

The above crude compound was dissolved in 125 cc. of anhydrous tetrahydrofuran and added dropwise to a mixture of 250 cc. of a 4 N solution of methyl magnesium bromide in ether and 375 cc. of tetrahydrofuran. The mixture was refluxed with stirring for 24 hours, cooled, poured into an excess of Dry Ice contained in a Dewar flask and let stand for 24 hours; at the end of this time the contents of the flask were poured into 2 liters of 2 N sulfuric acid and extracted repeatedly with ethyl acetate-ether 1:1, the combined extracts washed with water, dried over anhydrous sodium sulfate and evaporated to dryness. Crystallization from methanol-water gave Δ⁵-22-isospirostene-3β,12β-diol-12α-propiolic acid.

The foregoing compound was dissolved in 75 cc. of pyridine and 50 cc. of acetic anhydride and the mixture kept at room temperature overnight. It was then poured into water, heated on the steam bath for 30 minutes to hydrolyze the excess of reagent and the formed precipitate collected by filtration, washed with water and dried, thus affording the corresponding 3-monoacetate.

*Example II*

A solution of 1 g. of Δ⁵-22-isospirostene-3β,12β-diol-12α-propiolic acid-3-monoacetate in 5 cc. of absolute ethanol was stirred under hydrogen with 1 g. of Lindlar catalyst until 1 mol of hydrogen had been absorbed. The catalyst was filtered and the solution evaporated to dryness. Recrystallization from methanol-water gave the unsaturated lactone, namely, 12α-(2-carboxyvinyl)-Δ⁵-22-isospirostene-3β,12β-diol-spirolactone 3-acetate. The product has the formula:

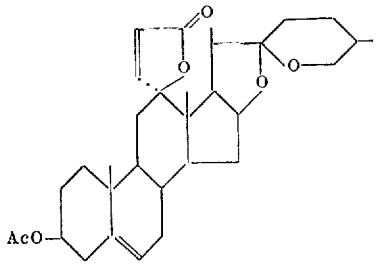

*Example III*

A solution of 5 g. of Δ⁵-22-isospirostene-3β,12β-diol-propiolic acid 3-acetate in 25 cc. of absolute ethanol was stirred under hydrogen in the presence of 1 g. of 5% palladium charcoal as catalyst. Two moles of hydrogen were absorbed rapidly. After filtration of the catalyst and evaporation of the solvent there was obtained the saturated lactone, i.e. 12α-(2-carboxyethyl)-Δ⁵-22-isospirostene-3β,12β-diol spirolactone 3-acetate of the following formula:

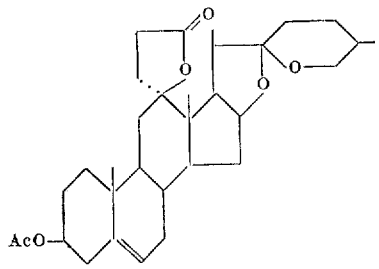

*Example IV*

A mixture of 3 g. of the saturated lactone obtained as described in the previous example and 12 cc. of acetic anhydride was heated for 5 hours in a sealed tube at 195° C., the contents of the tube were poured into water and then heated for half an hour on the steam bath to decompose the excess of anhydride. The solution containing the crude pesudosapogenin was cooled to 15° C. and then oxidized with a solution of chromium trioxide in 90% acetic acid until the color of the reagent persisted in the mixture (the oxidizing solution was prepared by dissolving 4.2 g. of chromium trioxide in 54.5 cc. of 90% acetic acid). The reaction mixture was stirred for 30 minutes further, the excess of reagent was destroyed with sodium bisulfite solution and the mixture poured into water, extracted with ethyl acetate, the extracts washed with water, sodium bicarbonate solution and water to neutral, dried and evaporated to dryness. The residue was refluxed for 1 hour with a mixture of 50 cc. of t-butanol and 20 cc. of 20% aqueous potassium hydroxide, it was then poured into water, extracted with ethyl acetate and the extracts discarded, the aqueous layer acidified and reextracted also with ethyl acetate.

The organic extract was washed with water to neutral, dried and evaporated to dryness. Chromatography of the residue on neutral alumina gave the pure 12α-(2-carboxyethyl)-Δ⁵,¹⁶-pregnadiene-3β,12β-diol-20-one spirolactone. The product has the following formula:

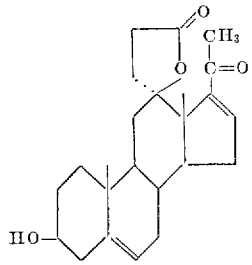

*Example V*

A solution of 1.25 g. of the above lactone in 50 cc. of ethyl acetate was hydrogenated at room temperature and atmospheric pressure using 200 mg. of prereduced 10% palladium on charcoal catalyst until 1 molar equivalent of hydrogen was absorbed, the catalyst was filtered and the filtrate evaporated to a small volume. Addition of methanol gave the crystalline 12α-(2-carboxyethyl)-Δ⁵-pregnene-3β,12β-diol-20-one spirolactone of the formula:

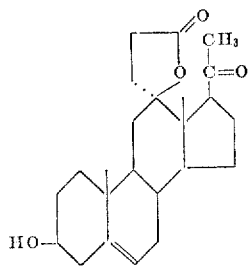

A solution of 1 g. of the latter compound in 80 cc. of toluene and 20 cc. of cyclohexanone was dried by distilling off 10 cc. of solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated until crystallization started. There was thus obtained 12α-(carboxyethyl)-Δ⁴-pregnen-12β-ol-3,20-dione spirolactone. The compound has the following formula:

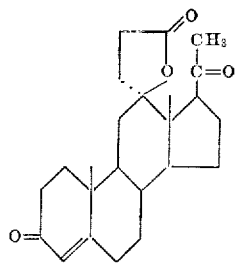

Example VI

A solution of 1 g. of 12α-(2-carboxyethyl)-Δ$^{5,16}$-pregnadiene-3β,12β-diol-20-one spirolactone, obtained as described in Example IV, in 50 cc. of glacial acetic acid was treated dropwise at approximately 15° C. with 1.1 molar equivalents of chromium trioxide in 50% aqueous acetic acid. The mixture was stirred for 15 minutes further, diluted with water, and the formed precipitate collected by filtration thus producing 12α-(2-carboxyethyl)-Δ$^{4,16}$-pregnadiene-12β-ol-3,20-dione spirolactone.

A suspension of 500 mg. of the latter compound in 6 cc. of absolute benzene was treated with 0.3 cc. of Triton B and 0.3 cc. of t-butylhydroperoxide and the mixture kept at room temperature overnight, it was then poured into water, acidified slightly with hydrochloric acid and extracted with ethyl acetate. The washed and dried extracts were evaporated and crystallized from methanol-water. The resulting epoxide (0.66 g.) was dissolved in 78 cc. of acetic acid and treated with 3.9 cc. of a saturated solution of hydrobromic acid in acetic acid. The mixture was kept at room temperature for 30 minutes, poured into water and extracted with ethyl acetate. The washed and dried extracts were evaporated to dryness, the residue taken up in ethanol and stirred with 200 mg. of 5% palladium on carbon catalyst under hydrogen atmosphere until 1 mol of hydrogen was consumed. It was then filtered through celite and the filtrate evaporated to dryness. Crystallization from acetone-hexane gave 12α-(2 - caboxyethyl) - Δ$^4$-pregnene-12β,17α-diol-3,20-dione spirolactone. The compound has the following formula:

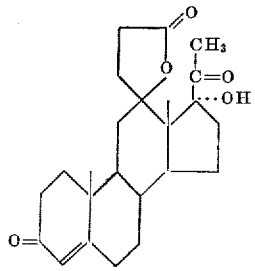

Example VII

Example IV and V were repeated but using the 12α-(2-carboxyvinyl)-Δ$^5$-22-isospirostene-3β,12β-diol spirolactone 3-acetate obtained in Example II as starting material. There were thus obtained the corresponding unsaturated lactones.

Example VIII

By following the method of Example VI, 500 mg. of 12α - (2-carboxyvinyl)-Δ$^{4,16}$-pregnadien-12β-ol-3,20-dione spirolactone, obtained in the preceding example was treated with t-butylhydroperoxide in benzene solution and in the presence of Triton B as catalyst. The resulting epoxide was treated with hydrogen bromide to thus form the bromohydrin and then hydrogenated in ethanol solution and in the presence of 5% palladium on carbon catalyst to afford finally the oxido lactone. 12α-(2-carboxyethyl)-Δ$^4$-pregnen12β-ol-3,20-dione spirolactone C–1→steroid C–17-oxide, represented by the following formula:

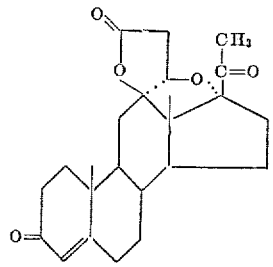

Example IX 1 g. of 12α-ethinyl-Δ$^5$-22-isospirostene-3β,12β-diol was acetylated in the usual manner to afford 12α-ethinyl-Δ$^5$-22-isospirostene-3β,12β-diol 3-acetate.

The above compound was dissolved in 10 cc. of pyridine, the solution cooled to 0° C. and 5 cc. of thionyl chloride was added dropwise with stirring in the course of 15 minutes. The mixture was stirred for 30 minutes at room temperature, then poured into water, the precipitate collected by filtration, washed with water, dried and crystallized from acetone-hexane thus producing 12-ethinyl-Δ$^{5,11}$-22-isospirostadien-3β-ol-acetate.

The foregoing compound was treated with methyl magnesium bromide followed by treatment with carbon dioxide and acetylation, in accordance with the procedure of Example I, thus producing Δ$^{5,11}$-22-isospirostadien-3β-ol acetate 12-propiolic acid.

Example X

A solution of 1 g. of the latter compound in 10 cc. of absolute ethanol was hydrogenated in the presence of 1 g. of Lindlar catalyst, by following the method of Example II. The crude hydrogenation product was dissolved in 10 cc. of acetic acid, 7 cc. of 50% sulfuric acid were added and the mixture refluxed for 5 hours. It was then cooled, poured into water and extracted with benzene. The organic extract was washed with water to neutral, dried over anhydrous sodium sulfate and evaporated to dryness. The crude product was acetylated in a conventional manner, thus producing 12β-(2-carboxyvinyl)-Δ$^5$-22-isospirostene-3β,11β-diol lactone 3-acetate.

The above compound was subjected to the sapogenin degradation method described in Example IV and then oxidizing under Oppenauer conditions by following the method of Example V to afford finally 12β-(2-carboxyvinyl) - Δ$^{4,16}$-pregnadien-11β-ol-3,20-dione lactone. The compound has the following formula:

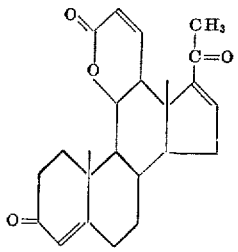

Example XI

A solution of 200 mg. of the foregoing lactone in 10 cc. of ethyl acetate was hydrogenated at room temperature and atmospheric pressure in the presence of 40 mg. of prereduced 10% palladium on carbon catalyst, in accordance with the method of Example V; there was thus obtained 12β-(2-carboxyvinyl)-Δ⁴-pregnen-11β-ol-3,20-dione lactone of the following formula:

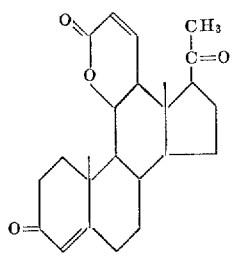

Example XII

A suspension of 500 mg. of 12β-(2-carboxyvinyl)-Δ⁴,¹⁶-pregnadien-11β-ol-3,20-dione lactone, obtained as described in Example X in 10 cc. of absolute benzene was treated with 0.3 cc. of Triton B and 0.3 cc. of t-butylhydroperoxide and the mixture kept at room temperature overnight; it was then poured into water, acidified slightly with hydrochloric acid and extracted with ethyl acetate. The washed and dried extracts were evaporated and crystallized from methanol-water. The resulting epoxide (0.66 g.) was dissolved in 78 cc. of acetic acid and treated with 3.9 cc. of a saturated solution of hydrobromic acid in acetic acid. The mixture was kept at room temperature for 30 minutes, poured into water and extracted with ethyl acetate. The washed and dried extracts were evaporated to dryness, the residue taken up in ethanol and stirred with 200 mg. of 5% palladium on carbon catalyst under hydrogen atmosphere until 1 mol of hydrogen was consumed. It was then filtered through celite and the filtrate evaporated to dryness. Chromatography of the residue on neutral alumina gave 12β-(2-carboxyvinyl)-β⁴-pregnene-11β,17α-diol-3,20-dione lactone. This compound has the following formula:

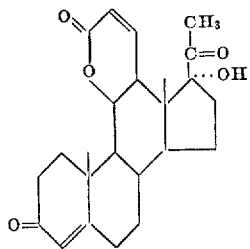

Example XIII

A solution of 1 g. of 12α-(2-carboxyethyl)-Δ⁴-pregnene-12β,17α-diol-3,20-dione lactone, obtained as described in Example VI was treated with 2 g. of lead tetraacetate and the mixture stirred at room temperature for 4 hours (until negative reaction with iodine-starch paper). It was then poured into water containing 2 g. of oxalic acid, and the formed precipitate collected by filtration, washed with water to neutral and air dried. After chromatography on neutral alumina there was obtained the desired 12α-(2-carboxyethyl)-Δ⁴-androsten-17β-ol-3,17-dione lactone. This compound has the following formula:

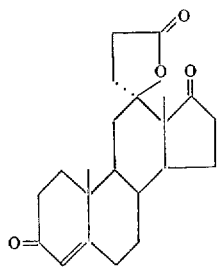

In a similar manner, but using 12β-(2-carboxyvinyl)-Δ⁴-pregnene-11β,17α-diol-3,20-dione lactone as starting material, there was obtained 12β-(2-carboxyvinyl)-Δ⁴-androsten-11β-ol-3,17-dione lactone of the following formula:

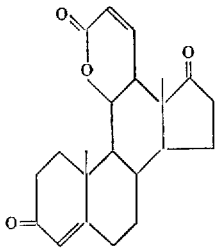

I claim:
1. A compound of the following formula:

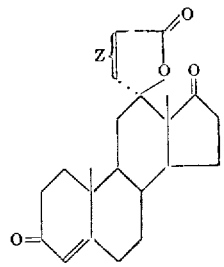

wherein Z is selected from the group consisting of a double bond and a saturated linkage.

2. A compound of the following formula:

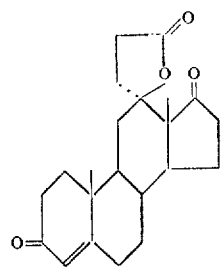

3. A compound of the following formula:

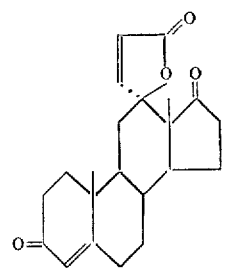

4. A compound of the following formula:

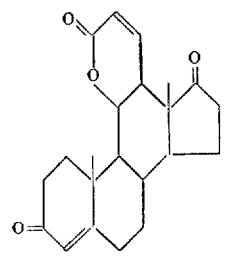

5. A compound of the following formula:

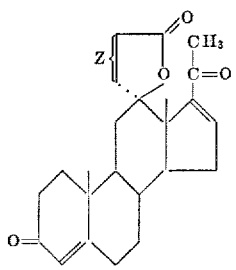

wherein Z is selected from the group consisting of a double bond and a saturated linkage.

6. A compound of the following formula:

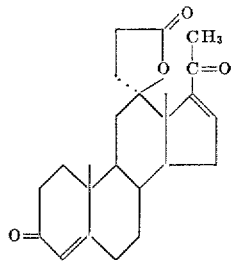

7. A compound of the following formula:

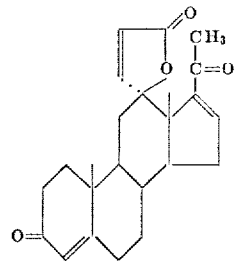

8. A compound of the following formula:

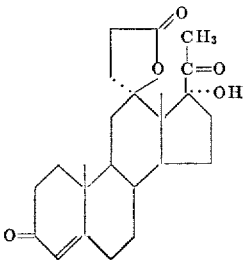

9. A compound of the following formula:

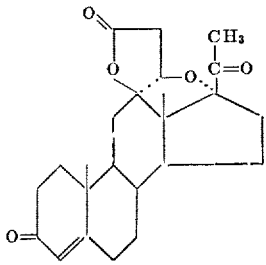

10. A compound of the following formula:

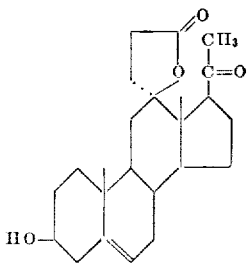

11. A compound of the following formula:

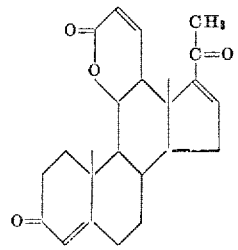

12. A compound of the following formula:

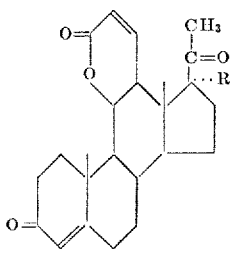

wherein R is selected from the group consisting of hydrogen and hydroxy.

13. A compound of the following formula:

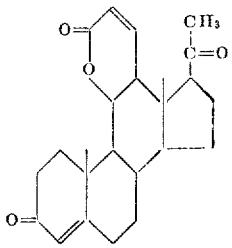

14. A compound of the following formula:

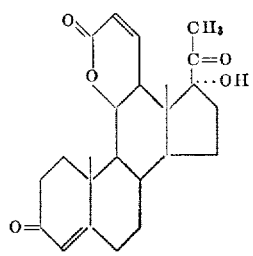

No references cited.

UNITED STATES PATENT OFFICE
CERTIFICATE OF CORRECTION

Patent No. 3,102,117            August 27, 1963

Otto Halpern

It is hereby certified that error appears in the above numbered patent requiring correction and that the said Letters Patent should read as corrected below.

Column 2, lines 5 to 15, the right-hand formula should appear as shown below instead of as in the patent:

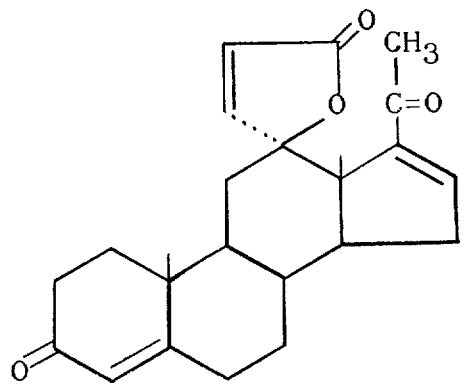

same column 2, formula (IV) should appear as shown below instead of as in the patent:

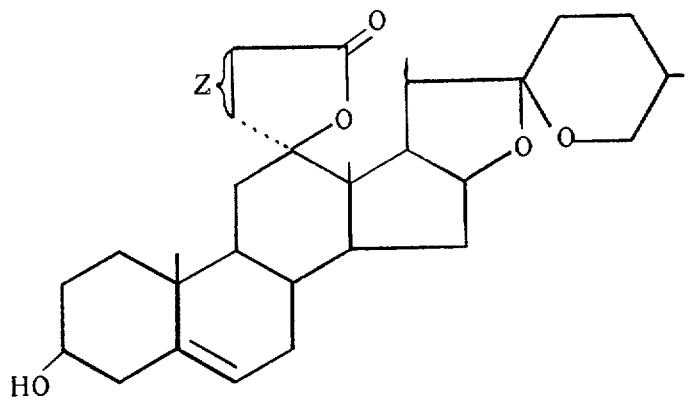

3,102,117 column 3, formula (VI) should appear as shown below instead of as in the patent:

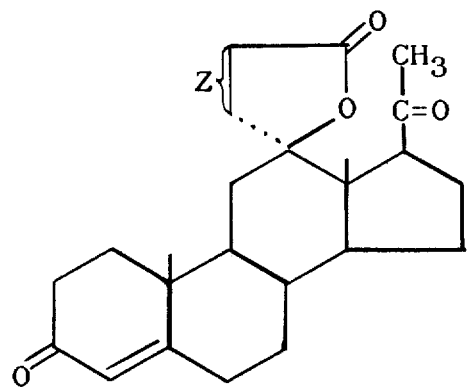

Signed and sealed this 5th day of May 1964.

(SEAL)
Attest:

ERNEST W. SWIDER
Attesting Officer

EDWARD J. BRENNER
Commissioner of Patents